Sept. 27, 1949.  W. C. LUENEBURG  2,483,319
PRESSURE COOKER COVER FASTENER
Filed April 30, 1947  4 Sheets-Sheet 1
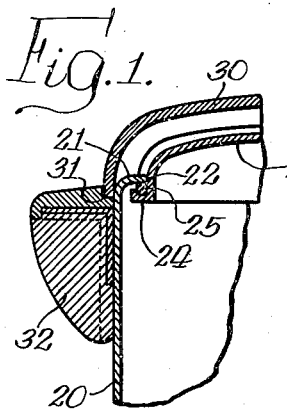
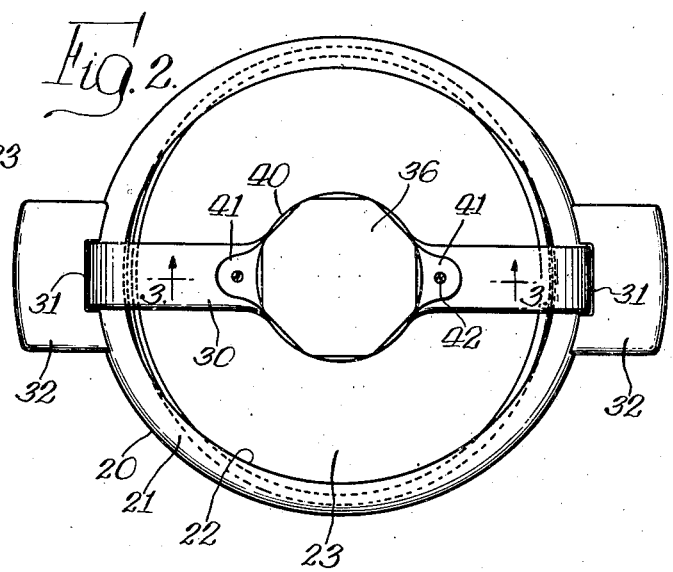
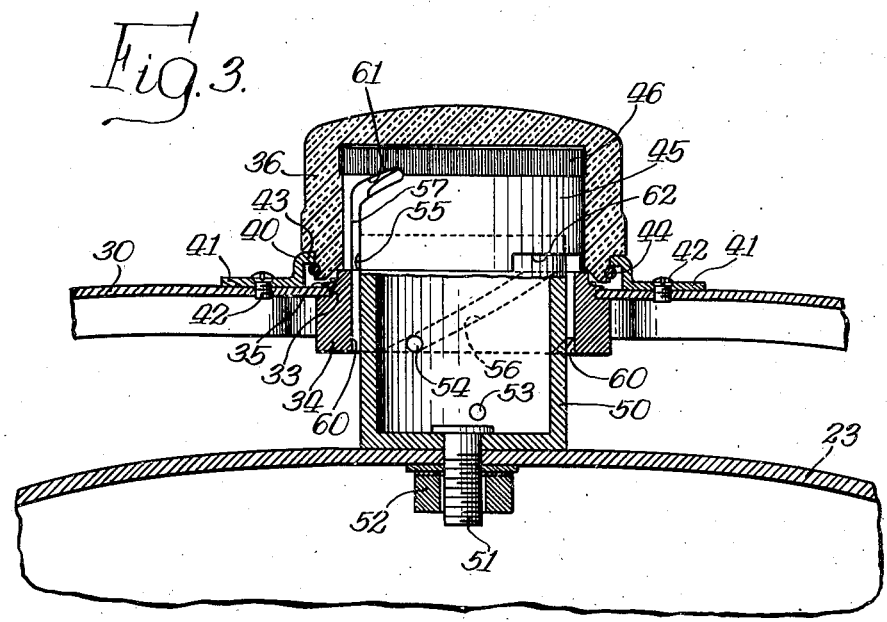
INVENTOR.
Walter C. Lueneburg,
BY
Davis, Lindsey, Smith & Shontz
Attys Sept. 27, 1949. W. C. LUENEBURG 2,483,319
PRESSURE COOKER COVER FASTENER
Filed April 30, 1947 4 Sheets-Sheet 2
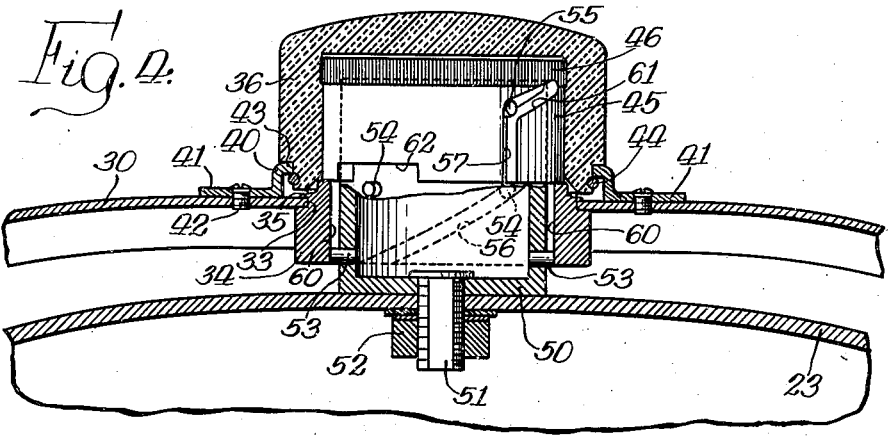
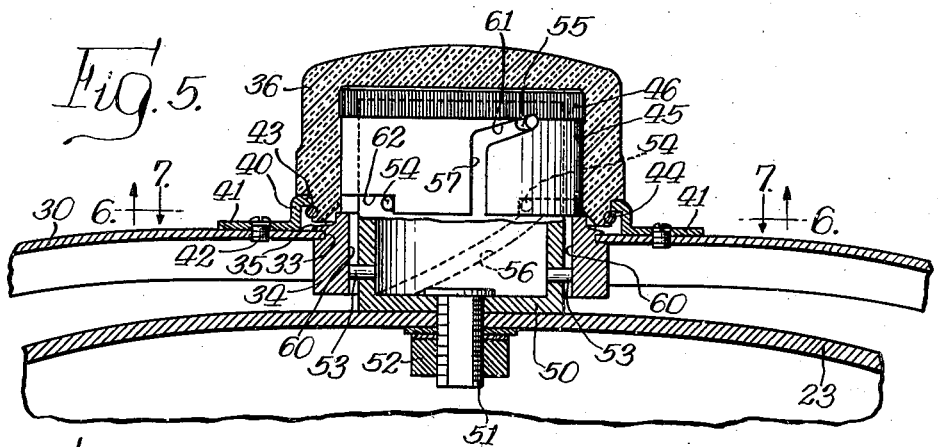
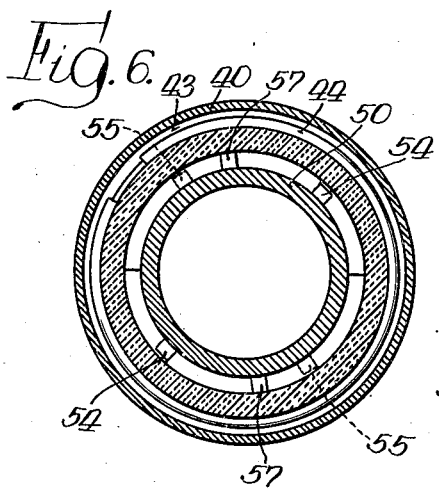
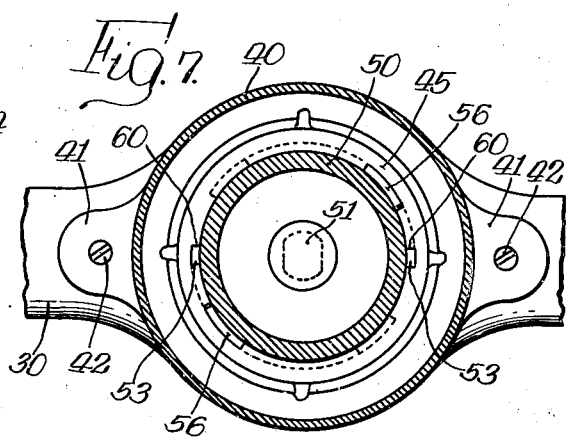
INVENTOR.
Walter C. Lueneburg
BY
Davis, Lindsey, Smith + Shonts
Attys Sept. 27, 1949. W. C. LUENEBURG 2,483,319
PRESSURE COOKER COVER FASTENER
Filed April 30, 1947 4 Sheets-Sheet 3
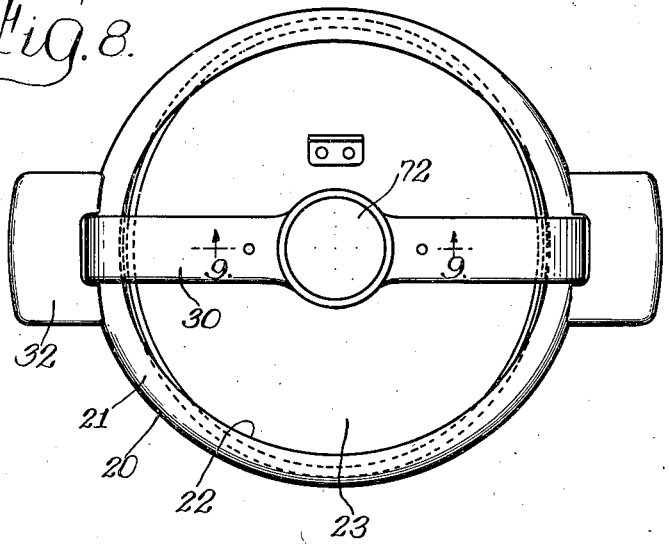
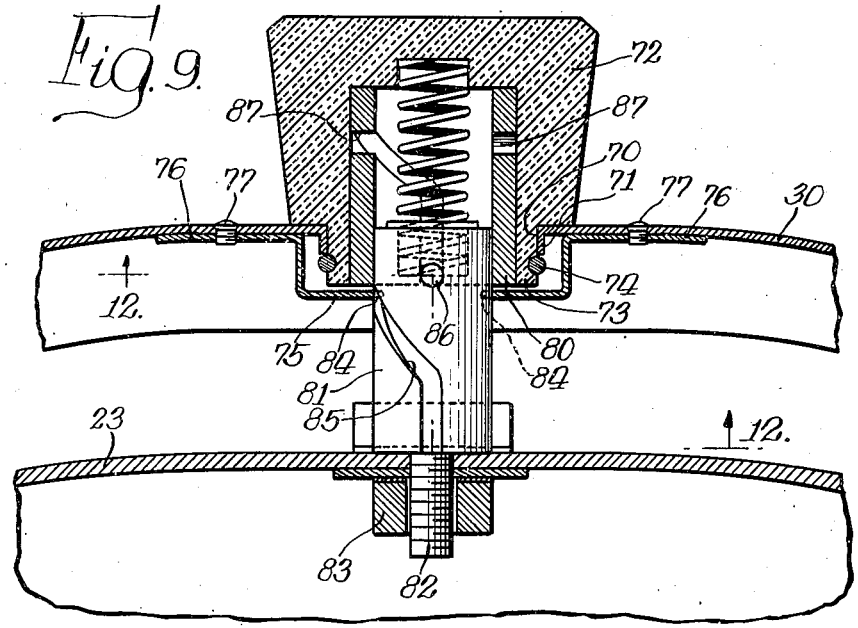
INVENTOR.
Walter C. Lueneburg,
BY
Davis, Lindsey, Smith + Shonts
Atty's Sept. 27, 1949.  W. C. LUENEBURG  2,483,319
PRESSURE COOKER COVER FASTENER
Filed April 30, 1947  4 Sheets-Sheet 4
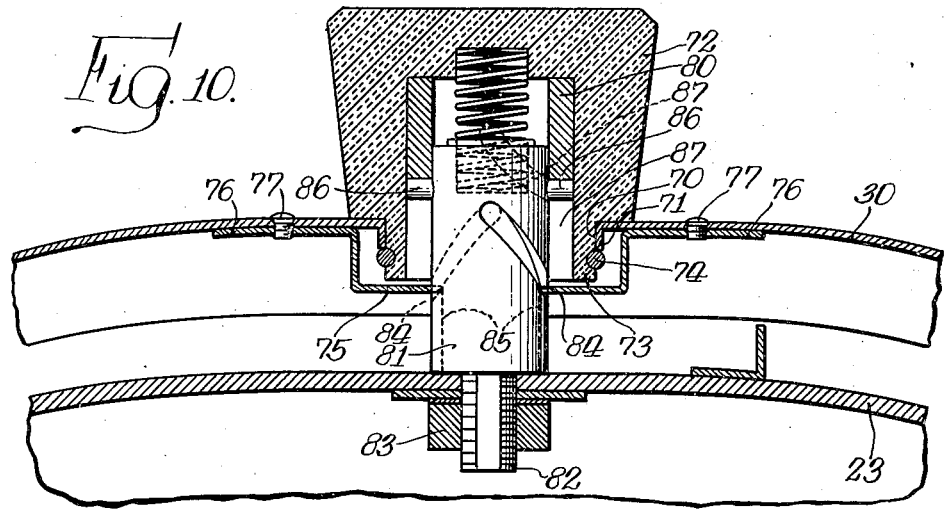
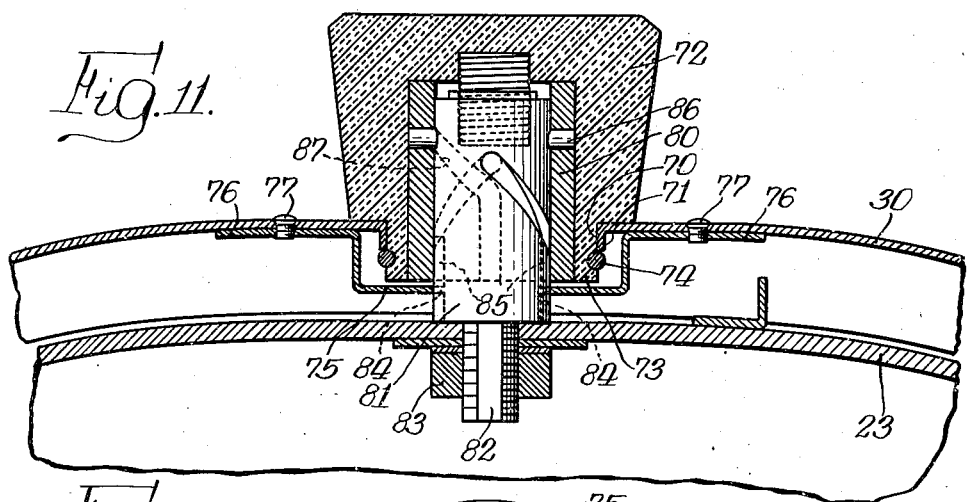
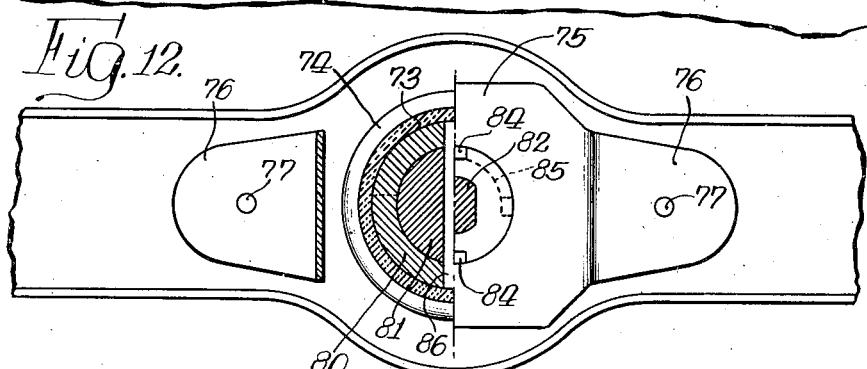
INVENTOR.
Walter C. Lueneburg
BY
Davis, Lindsey, Smith + Shonts
Attys.

Patented Sept. 27, 1949

2,483,319

UNITED STATES PATENT OFFICE 2,483,319

PRESSURE COOKER COVER FASTENER

Walter C. Lueneburg, Evanston, Ill., assignor to Ekco Products Company, Chicago, Ill., a corporation of Illinois Application April 30, 1947, Serial No. 745,065

13 Claims. (Cl. 220—25)

1

The invention relates generally to pressure cookers of a type suitable for home use, and more particularly to the cover fastening structure of such a cooker.

The general object of the invention is to provide a pressure cooker of the type having an elliptical opening and cover, with the cover removable from and insertable into the receptacle by tilting the cover and rotating it 90° out of alignment with the opening, the cooker having novel means for effectively moving the cover into tight sealing engagement with the underside of the margin of the opening so that pressure may be built up within the receptacle.

A further object is to provide a pressure cooker of the foregoing type, having a manually operable element rotatable with the cover to turn the latter into and out of alignment with the receptacle opening and adapted, after turning the cover into such alignment, to be rotated independently of the cover to move the cover into tight sealing engagement with the margin of the opening.

Still another object is to provide a pressure cooker of the foregoing type, having a knob which may be manually rotated first to turn the cover into alignment with the receptacle opening and to simultaneously draw the cover upwardly toward or into engagement with the margin of the opening; and thereafter by continued rotation independently of the cover to tighten such engagement so that pressure may be built up within the receptacle.

Other objects and advantages will become apparent from the following description taken in connection with the accompanying drawings, in which:

Fig. 1 is a fragmentary sectional view of a pressure cooker showing the manner in which the cover engages the receptacle.

Fig. 2 is a plan view of the pressure cooker shown in Fig. 1 and provided with a cover fastener embodying the features of the invention, the cover being illustrated in a position ready for removal.

Fig. 3 is an enlarged fragmentary sectional view taken on the line 3—3 of Fig. 2.

Fig. 4 is a view similar to Fig. 3 but showing the position of the parts of the fastener when the cover is turned into alignment with the receptacle opening.

Fig. 5 is a view similar to Figs. 3 and 4 but showing the position of the parts when the cover is fully clamped in sealing engagement with the receptacle.

2

Fig. 6 is a horizontal sectional view taken on the line 6—6 of Fig. 5.

Fig. 7 is a horizontal sectional view taken on line 7—7 of Fig. 5.

Fig. 8 is a view similar to Fig. 2 but showing another embodiment of the invention.

Fig. 9 is a vertical sectional view taken on the line 9—9 of Fig. 8.

Fig. 10 is a view similar to Fig. 9 showing the position of the parts when the cover is turned into alignment with the receptacle opening.

Fig. 11 is a view similar to Figs. 9 and 10 but showing the position of the parts when the cover is fully raised into sealing engagement with the receptacle.

Fig. 12 is a horizontal sectional view taken substantially on the line 12—12 of Fig. 9.

The present invention relates to a cover fastener for a pressure cooker of the type in which the receptacle has an elliptical top opening and a cover, with the latter engageable with the underside of the margin of said opening for sealing the receptacle, and movable therethrough when tilted and rotated 90° out of alignment with the opening. With this type of cooker, a cover fastener embodying the features of the invention effects a tight seal between the cover and the margin of the receptacle opening so that steam pressure may be raised within the receptacle. To illustrate the invention, I have shown in Figs. 1 and 2 a receptacle 20 which is illustrated as of generally cylindrical form with the side wall thereof bent inwardly at its upper edge to provide a flange 21. The flange 21 defines an opening 22 adapted to be closed by a cover 23.

The flange 21 and the cover 23 are so arranged that the cover extends under the flange to engage the underside thereof so that steam pressure within the receptacle 20 will tend to cause the cover to move into tight clamping engagement with the flange 21. Thus, the construction may be said to be in some respects self-sealing. In the present instance, the cover 23 is provided with an outwardly directed flange 24 (see Fig. 1) at its periphery with a gasket 25 of rubber or the like seated and rigidly secured in the flange 24 to engage the flange 21 when the cover is clamped in position.

In this type of construction, the opening 22, as well as the cover 23, is preferably made elliptical or oval in form, and the cover, when it is to be removed, is rotated 90° out of alignment with the opening 22, as illustrated in Figs. 2 and 8, so that the shorter diameter of the cover can be passed through the longer diameter of the opening 22.

To permit such passage, the cover 13 is tilted and one edge at the extremity of the longer diameter is passed through the opening and the entire cover thereby removed. This general construction of the cover and the opening which it closes is well known in the art.

The invention herein relates to the means for supporting and fastening the cover 23 so that it may be readily removed from the receptacle and may be reinserted therein and forced into tight clamping engagement with the flange 21 of the receptacle so that steam pressure may be built up within the receptacle. The cover supporting means comprises generally a bridge member adapted to rest on the receptacle to rotatably support the cover in its movement in and out of alignment with the opening 22 and to provide for movement of the cover vertically relative to the receptacle. The cover is preferably carried on a supporting member which extends upwardly from the cover through the bridge member and into a manually rotatable element located above the bridge member. The bridge member and the rotatable element are provided with connections with the cover support by which rotation of the manually operable element, when the cover is out of alignment with the receptacle opening, turns the cover into such alignment and simultaneously raises it toward the margin of the receptacle opening. When the cover is thereby turned into such alignment, further rotation of the manually operable element in the same direction causes further lifting movement of the cover without rotation of the latter and thereby draws the cover into tight sealing engagement with the margin of the opening.

In the particular embodiment illustrated in Figs. 1 to 7 of the drawings, I have shown a bridge member 30 of generally channel-shaped cross section upwardly bent intermediate its ends so that said ends may rest in pockets 31 provided on the receptacle, preferably in the handle portions 32 thereof. The bridge member thus spans the opening 22 and is held against rotation relative to the receptacle. At its mid point, the bridge member 30 is provided with an aperture 33 in which is secured a ring 34. In the present instance, the ring 34 extends below the top of the bridge member 30 and is provided with a flange 35 spun over the top surface of the bridge member 30 to clamp the latter against a shoulder formed on the ring 34. The ring 34 is thus rigidly secured to the bridge member 30 in alignment with the aperture 33.

Mounted above the bridge member is a manually operable element in the form of a knob 36. The knob 36 has an external shape which may be readily grasped for turning and, in the present instance, is octagonal, as shown in Fig. 2. To support the knob 36 and secure it to the bridge member 30, a securing ring 40 is provided, the ring 40 having a pair of laterally extending ears 41 adapted to be rigidly secured to the bridge member 30 as by screws 42. The ring 40 extends above the bridge member 30 for a short distance and at its top is provided with an inwardly turned flange 43 providing a seat for the knob 36. To secure the knob 36 to the flange 43, the former is provided with a reduced lower end fitting within the flange 43 and held against vertical movement relative thereto by a spring locking ring 44. Thus, the knob is held against vertical movement relative to the ring 40 and bridge member 30, but may be rotated relative thereto. Mounted within the knob and forming a part thereof is a sleeve 45, the latter having a knurled portion 46 at its upper end by which it is held securely in the knob 36 with a press fit. The knob is preferably made of molded plastic material, which is not a good conductor of heat so that the knob will remain relatively cool and may therefore be grasped by the hand without danger of burning.

Carrying the cover 23 is a support 50 which, in the present instance, has a cup-shaped form. To secure the cover 23 and support together, the two are provided with a central aperture to receive a flat-sided screw 51 with a nut 52 clamping the parts together.

The support 50 is interconnected with the ring 34 and knob 36 in such a manner that, assuming the cover is out of alignment with the receptacle opening, as shown in Fig. 2, the knob may be turned in one direction to rotate the cover into alignment with the receptacle opening, simultaneously raising the cover toward the margin of said opening and thereafter, by continued rotation of the knob 36, effecting a further upward movement of the cover, without turning it, so that the cover is drawn into tight sealing engagement with the margin of the receptacle opening. To this end, the ring 34 and knob 36 are provided with cam connections with the support 50 to effect such movement of the cover.

Specifically, such cam connections comprise three sets of radially extending pins carried on the cylindrical wall of the support 50. Thus, I provide a lower set of pins 53, an intermediate set of pins 54 and an upper set of pins 55. The lower set of pins 53 and intermediate set 54 cooperate with grooves provided in the ring 34 while the upper set of pins 55 cooperate with grooves provided in the knob sleeve 45. When the cover is 90° out of alignment with the receptacle opening, as shown in Fig. 3, the lower set of pins 53 is spaced below the ring 34, the intermediate set of pins 54 is located in slanting cam grooves 56 in the ring 34, and the upper set of pins 55 is positioned in cam grooves 57 provided in the sleeve 45. The grooves 56 and 57 with their related pins 54 and 55 provide for the turning movement of the cover and simultaneous raising thereof when the cover is turned from the position shown in Figs. 2 and 3 into alignment with the receptacle opening, as shown in Fig. 4. To accomplish such movement, the knob is rotated clockwise, as shown in Fig. 2, and the support 50 is caused to rotate with the knob 36 by virtue of the fact that the pins 55 are then positioned in lower vertical portions of the cam grooves 57. The lower vertical portions of the cam grooves 57, while causing the support 50 to rotate with the knob, permit the support to be raised, which movement is effected by the pins 54 operating in the slanting cam grooves 56 in the ring 34. The grooves 56 extend for 90° about the inner periphery of the ring 34 so that raising movement of the cover is effected while it is turned 90° from its disaligned position and into its aligned position with the receptacle opening 22. Thus, the cover will thereby be turned into alignment and raised toward its closing position. The position of the parts when the cover is so located is shown in Fig. 4.

To effect further upward movement of the cover without rotating it so that it remains in alignment with the receptacle opening, the cover is adapted to be held against rotation by the ring 34. To this end, the ring 34 is provided with vertical grooves 60 which the lower set of pins 53 enter when the cover has been raised to the extent shown in Fig. 4. Because of the vertical position of the grooves 60, the cover 23 is prevented from being turned during further upward movement. Such further upward movement is effected by the upper portions of the cam grooves 57, which, as is apparent in the drawings, are slanted as shown at 61. Thus, by further rotation of the knob 36 in the same direction as it was theretofore rotated, the cover and its support 50 will be held against rotation by the pins 53 in grooves 60 while it is being raised by the pins 55 and the slanting portions 61. When the cover is thereby fully raised, the parts occupy the positions shown in Fig. 5. Thus, such further raising of the cover draws the gasket 25 on the cover into tight sealing engagement with the flange 21 on the receptacle so that steam pressure may be built up within the receptacle. To provide space for the intermediate pins 54 during such further upward movement, the knob sleeve 45 is notched as at 62 to provide space for the pins 54.

The closing movement of the cover is apparent from the foregoing description. To open the cover and remove it from the receptacle, the reverse operation is performed. Thus, the knob 36 is rotated counterclockwise, which causes the pins 55 to move downwardly in the slanting portions 61 of the slots 57 without rotating the cover. By such movement, the cover is forced downwardly out of tight engagement with the margin of the receptacle opening, and during such movement the pins 53 move to the bottom of the grooves 60 in the sleeve 34, and the pins 54 enter the tops of the slanting grooves 56 in the ring 34. The knob 36 is then rotated through 90° to move the cover out of alignment with the receptacle opening so that it may be removed by tilting, as heretofore described. During such 90° movement of the knob 36, the pins 55 move downwardly in the groove 57 so that the cover rotates with the knob, the pins 53 move out of the grooves 60, and the pins 54 move downwardly in the slanting grooves 56 to lower the cover out of contact with the margin of the receptacle opening.

In the embodiment of the invention shown in Figs. 8 to 12, inclusive, a similar action occurs. Thus, generally described, a knob is provided by which the cover may be turned from a position out of alignment with the receptacle opening, 90° into alignment and simultaneously raised toward the margin of the receptacle opening. During further rotation of the knob, the cover is held against rotation but is raised to move it into tight sealing engagement with the receptacle opening.

As shown in these figures, the bridge member 30 is provided with a central aperture 70, a downwardly extending flange 71 being provided within the aperture 70. Seated on the bridge member is a knob 72 preferably of plastic material and having a reduced lower end 73 extending through the aperture 70, the knob being held in place by a spring clamping ring 74. Mounted under the bridge member 30 in spaced relation thereto is a fixed ring 75 having upwardly and laterally bent ears 76 secured to the bridge member as by screws 77. While the ring 75 is held stationary by virtue of such connection to the bridge member, knob 72 may be freely rotated within the aperture 70, but is held against vertical movement relative to the bridge member. The knob 72 includes as a part thereof an internal sleeve 80 press-fitted within the knob 72. Supporting the cover 23 is a cylindrical stem 81 having a reduced threaded lower end 82 extending through the cover 23 and clamped thereto as by a nut 83.

As in the former embodiment, the knob 72 and ring 75 are provided with cam connections with the stem 81 to effect the desired movement of the cover 23. Such cam connections, in the present instance, comprise a pair of diametrically opposite, inwardly directed lugs 84 provided on the ring 75 and entering a pair of cam grooves 85 provided in the stem 81. The cam connection between the knob 72 and the stem 81 comprises a diametrically positioned pin 86 mounted in the stem 81 adjacent the upper end thereof and extending beyond the sides of the stem to enter a cam groove 87 formed in the sleeve 80.

When the cover is out of alignment with the receptacle opening, as shown in Fig. 8, the parts of the device occupy the positions shown in Fig. 9. To close the cover, the knob 72 is then rotated clockwise. During such movement of the knob 72, the ends of the pin 86 are in the lower portions of the cam grooves 87. Such lower portions are positioned vertically so that rotation of the knob 72 causes rotation of the stem 81 and the cover 23 to move the latter into alignment with the receptacle opening 22. The vertical position of the lower portions of the slots 87, however, permits vertical movement of the stem. Such vertical movement of the stem is effected by the lugs 84 and the cam slots 85. To this end, the upper portions of the cam slots 85 are slanted so that rotation of the stem 81 causes upward movement thereof. The cover is thereby turned back into alignment with the receptacle opening and is raised toward the margin of such opening.

Further turning of the knob 72 is utilized to draw the cover upwardly into tight sealing engagement with the margin of the receptacle opening without turning the cover. To this end, the lower portions of the slots 85 in the stem 81 are vertically positioned so that, when the lugs 84 enter such lower portions, the stem 81 is held against rotation, although it is permitted to move vertically. At the same time that the lugs 84 enter the lower portions of the slots or grooves 85, the ends of the pin 86 enter upper slanting portions of the grooves 87 to effect further raising of the stem 81 by continued rotation of the knob 72. The cover 23 will thus be drawn upwardly into tight sealing engagement with the margin of the receptacle opening so that pressure may be built up within the receptacle. To remove the cover, reverse rotation of the knob 72 effects the desired shifting of the cover downwardly and out of alignment with the receptacle opening so that it may be removed by tilting, as in the case of the structure shown in Figs. 1 to 7.

I claim:

1. In a pressure cooker comprising a receptacle having an elliptical top opening and a cover with the latter engageable with the underside of the margin of said opening and movable therethrough when tilted and rotated 90° out of alignment with the opening, a bridge member adapted to rest on the receptacle, a cover supporting element extending through said bridge member and rotatable and vertically movable relative to said bridge member, and a manually operable element in coaxial telescoping relation and having a connection with said cover supporting element for rotating the cover into and out of alignment with the receptacle opening, said connection being constructed to provide for rotation of the manually operable element relative to the cover supporting element after the cover is turned into alignment with said opening to draw the cover supporting element upwardly and thereby effect tight sealing engagement of the cover with the margin of said opening.

2. In a pressure cooker comprising a receptacle having an elliptical top opening and a cover with the latter engageable with the underside of the margin of said opening and movable therethrough when tilted and rotated 90° out of alignment with the opening, a bridge member adapted to rest on the receptacle, an annular member secured to said bridge member, a cover supporting element extending through said members and rotatable and vertically movable relative to said members, a manually rotatable hollow knob positioned over said bridge member and into which the upper end of said cover supporting element coaxially extends, and a rotary drive connection between said knob and said cover supporting element effective for turning said cover into and out of alignment with said opening, said connection being constructed to provide for rotation of said knob relative to said cover supporting element when the cover is in alignment with said opening and by such rotation to draw the cover supporting element upwardly to draw the cover into sealing engagement with the margin of said opening.

3. In a pressure cooker comprising a receptacle having an elliptical top opening and a cover with the latter engageable with the underside of the margin of said opening and movable therethrough when tilted and rotated 90° out of alignment with the opening, a bridge member adapted to rest on the reecptacle, a cover supporting element extending through said bridge member and rotatable and vertically movable relative to said bridge member, a manually rotatable element coaxially and telescopically associated with said cover supporting element for rotating said cover supporting element to turn said cover into and out of alignment with the receptacle opening, said manually rotatable element being rotatable relative to the cover supporting element after the cover is turned into alignment with said opening, and arcuate cam means associated with said manually rotatable element and adapted, when the latter is rotated relative to the cover supporting element, to draw the cover into sealing engagement with the margin of said opening.

4. In a pressure cooker comprising a receptacle having an elliptical top opening and a cover with the latter engageable with the underside of the margin of said opening and movable therethrough when tilted and rotated 90° out of alignment with the opening, a bridge member adapted to rest on said receptacle, a cover supporting element extending through said bridge member, a manually operable element, and a control member fixed to said bridge member, said cover supporting element being in telescoping relation and having radially extending operating connections with said manually operable element and said control member adapted, upon rotation of said manually operable element in one direction, to simultaneously turn said cover into alignment with the receptacle opening and to raise said cover and thereafter by continued rotation of said manually operable element to draw the cover upwardly into sealing engagement with the margin of said opening with the cover held against rotation.

5. In a pressure cooker comprising a receptacle having an elliptical top opening and a cover with the latter engageable with the underside of the margin of said opening and movable therethrough when tilted and rotated 90° out of alignment with the opening, a cover supporting element, a manually rotatable element, and a fixed member, said cover supporting element being in coaxial telescoping relation with said manually rotatable element and said fixed member and having cam connections both with said manually rotatable element and said fixed member for controlling the movement of the cover upon rotation of said manually rotatable element, the cam connection with said manually rotatable element providing for rotation of the cover during the first part of the rotation of said manually rotatable element in one direction and for raising of the cover during the later part, and the cam connection with said fixed member providing for raising of the cover during said first part and for holding the cover against rotation during said later part.

6. In a pressure cooker comprising a receptacle having an elliptical top opening and a cover with the latter engageable with the underside of the margin of said opening and movable therethrough when tilted and rotated 90° out of alignment with the opening, a fixed ring, a manually rotatable hollow knob, and a cover support extending coaxially upwardly through said ring and into said knob, said ring and said support having cooperating cam means and said knob and said support also having cooperating cam means, said two cam means together being shaped so that, when said knob is rotated in one direction, said cover rotates with said knob and is raised to turn the cover into alignment with said opening and to draw it toward the margin thereof and thereafter by continued rotation of said knob said cover is held against rotation and is drawn into sealing engagement with said margin.

7. In a pressure cooker comprising a receptacle having an elliptical top opening and a cover with the latter engageable with the underside of the margin of said opening and movable therethrough when tilted and rotated 90° out of alignment with the opening, a fixed ring element, a manually operable element held against movement axially of said ring element but rotatable relative thereto, and a cover supporting element in coaxially telescoping relation with the first two elements, said ring and manually operable elements respectively having cooperating radially extending cam connections with said cover supporting element, the cam connection between said manually operable element and said cover supporting element having a lower portion causing rotation of the cover supporting element with the manually operable element when the latter is rotated in one direction and an upper portion permitting relative rotation therebetween but causing upward movement of said cover supporting element, and the cam connection between said ring and said cover supporting elements being constructed to cause upward movement of the latter when said lower portion is operable and to hold the covering supporting element against rotation when said upper portion is operable.

8. In a pressure cooker comprising a receptacle having an elliptical top opening and a cover with the latter engageable with the underside of the margin of said opening and movable therethrough when tilted and rotated 90° out of alignment with the opening, a fixed ring, a manually rotatable hollow knob secured to said ring against axial movement but rotatable relative thereto, and a cover support extending within said knob and said ring, said knob having a cam groove and said support having a radial projection cooperating with the groove comprising a lower vertically extending portion adapted to hold the knob and support for rotation together but permitting the support to be moved vertically and an upper slanting portion permitting the knob to rotate relative to the support and by such rotation causing upward movement of the support, and said ring and said support having a similar cam connection arranged to cause upward movement of the support when the latter is rotated with the knob by said lower portion and to hold the support against rotation when said upper portion is operable.

9. In a pressure cooker comprising a receptacle having an elliptical top opening and a cover with the latter engageable with the underside of the margin of said opening and movable therethrough when tilted and rotated 90° out of alignment with the opening, a bridge member adapted to extend over said receptacle opening with its ends resting on the receptacle and held against rotation relative thereto, said bridge member having a central aperture, a ring secured to said bridge member in alignment with and extending below said aperture, a manually operable hollow knob mounted over said aperture and secured to said bridge member against vertical movement but rotatable relative thereto, and a cylindrical cover support extending upwardly through said ring and into said knob coaxially therewith, said knob having a cam groove and said support having a pin extending radially into said groove, the groove comprising a lower vertical portion for causing the support to rotate with the knob but permitting vertical movement of the support during such rotation and an upper slanting portion for causing vertical movement of the support when the knob is rotated relative thereto, said ring and said support having cooperating cam means including a slanting cam groove for causing vertical movement of the support when the latter rotates with said knob, said ring holding said support against rotation when vertical movement is imparted to said support by the cam groove of said knob.

10. In a pressure cooker comprising a receptacle having an elliptical top opening and a cover with the latter engageable with the underside of the margin of said opening and movable therethrough when tilted and rotated 90° out of alignment with the opening, a bridge member extending across the receptacle opening and seated on the receptacle adjacent the margin of said opening, said bridge member having a central aperture, a ring rigidly secured to said bridge member in said aperture, a hollow knob mounted over said aperture, a bearing member for securing the knob to said bridge member but permitting rotation of the knob, and a cup-shaped support secured to the cover and extending upwardly through said ring and into said knob, said support having radially extending pins, and said ring and said knob having cam grooves receiving said pins, said grooves being shaped so that upon rotation of said knob in one direction said support is raised and turned to bring the cover into alignment with the receptacle opening and adjacent the margin thereof and thereafter said support is held against rotation but is farther raised to effect sealing engagement between the cover and said margin.

11. In a pressure cooker comprising a receptacle having an elliptical top opening and a cover with the latter engageable with the underside of the margin of said opening and movable therethrough when tilted and rotated 90° out of alignment with the opening, a fixed ring, a hollow knob coaxial with said ring and held against axial movement but rotatable relative thereto, and a cylindrical cover support having its lower end secured to the cover and extending upwardly through said ring and into said knob, said support having three sets of radially extending pins, said ring having slanting cam grooves receiving one of said sets of pins and adapted, when the support is rotated in a direction to align the cover with the receptacle opening, to raise the cover toward the margin of said opening, said ring also having vertically extending cam grooves adapted to receive another of said sets of pins when the cover is aligned with said opening whereby said support is held against rotation, and said knob having cam grooves receiving the third set of said pins and comprising vertically extending portions for rotating the cover with the knob when said slanting grooves of said ring are functioning, and slanting portions adapted, when said vertically extending grooves of said ring are functioning, to draw the cover upwardly into sealing engagement with the margin of said opening.

12. In a pressure cooker comprising a receptacle having an elliptical top opening and a cover with the latter engageable with the underside of the margin of said opening and movable therethrough when tilted and rotated 90° out of alignment with the opening, a bridge member extending across the receptacle opening and seated on the receptacle adjacent the margin of said opening, said bridge member having a central aperture, a ring rigidly secured to the underside of said bridge member, a hollow knob seated on said bridge member and having a reduced lower end extending through said aperture, means for holding said knob against vertical movement relative to said bridge member but permitting rotation thereof, and a stem secured at its lower end to said cover and extending upwardly through said ring and into said knob, said stem having radially extending cam connections with said ring and said knob adapted, upon rotation of said knob in one direction, to turn the cover into alignment with the receptacle opening and simultaneously raise the cover toward the margin thereof and, upon continued rotation in said direction, to hold the cover against rotation and further raise it into sealing engagement with said margin.

13. In a pressure cooker comprising a receptacle having an elliptical top opening and a cover with the latter engageable with the underside of the margin of said opening and movable therethrough when tilted and rotated 90° out of alignment with the opening, a fixed ring, a hollow knob coaxial with said ring and held against axial movement but rotatable relative thereto, and a cylindrical stem having its lower end secured to the cover and extending upwardly through said ring into said knob, said ring having a pair of lugs extending radially inward and said stem having a pair of cam grooves receiving said lugs, said grooves having upper slanting portions adapted, when the stem is rotated in a direction to align the cover with the receptacle opening, to raise the cover toward the margin of said opening and lower vertical portions for holding the cover against rotation when moved into alignment with said opening, said stem having adjacent its upper end a diametrical pin extending at each end beyond the side of the stem, and said knob having a pair of cam grooves receiving the ends of said pin, said last-mentioned cam grooves comprising lower vertical portions for rotating the cover when the slanting portions of the grooves in the stem are functioning, and upper slanting portions adapted, when the vertical portions of the grooves in the stem are functioning, to raise the cover upwardly into sealing engagement with the margin of said opening.

WALTER C. LUENEBURG.

REFERENCES CITED

The following references are of record in the file of this patent:

UNITED STATES PATENTS

| Number | Name | Date |
| --- | --- | --- |
| 2,188,735 | Grundstrom | Jan. 30, 1940 |
| 2,388,375 | Warner, Jr. | Nov. 6, 1945 |
| 2,423,559 | Hvale | July 8, 1947 |
| 2,429,151 | Zimmer | Oct. 14, 1947 |